(12) United States Patent
Defontaine

(10) Patent No.: US 6,511,103 B1
(45) Date of Patent: Jan. 28, 2003

(54) SEALED CONNECTION DEVICE FOR A VENTILATION FILTER

(75) Inventor: Bernard Defontaine, Maurepas (FR)

(73) Assignee: Compagne Generale des Matieres Nucleaires, Velizy Villacoublay (FR)

( * ) Notice: Subject to any disclaimer, the term of this patent is extended or adjusted under 35 U.S.C. 154(b) by 0 days.

(21) Appl. No.: 09/695,621

(22) Filed: Oct. 24, 2000

(30) Foreign Application Priority Data

Nov. 18, 1999 (FR) .............................................. 99 14487

(51) Int. Cl.[7] .............................................. F16L 19/00
(52) U.S. Cl. ....................... 285/361; 285/360; 285/376; 285/396; 285/401; 285/402
(58) Field of Search ................................. 285/361, 360, 285/362, 376, 396, 401, 402; 55/503, 490

(56) References Cited

U.S. PATENT DOCUMENTS

| | | | | |
|---|---|---|---|---|
| 3,493,115 | A | * 2/1970 | Koches | ........................ 210/238 |
| 4,161,509 | A | * 7/1979 | Nowak | ........................ 422/179 |
| 4,334,900 | A | 6/1982 | Neumann | |
| 4,498,914 | A | 2/1985 | Ericksen | |
| 5,545,241 | A | 8/1996 | Vanderauwera et al. | |

OTHER PUBLICATIONS

Preliminary Search Report (in French) dated Jun. 26, 2000.
Annex to Preliminary Search Report (in French) dated Jun. 26, 2000.

* cited by examiner

Primary Examiner—Lynne H. Browne
Assistant Examiner—G M Collins
(74) Attorney, Agent, or Firm—Cohen, Pontani, Lieberman & Pavane

(57) ABSTRACT

The inventive device includes a cylindrical housing adapted to receive a filter, the housing having an axis being fixed at a second end to a ventilation circuit flange and having a first end mounted on a mobile companion flange, the companion flange being held in resilient manner under axial tension by holding means under tension, a sheath in alignment with and secured to the housing, about which sheath the companion flange slides axially, a seal disposed between the sheath and the companion flange, three fixed wheels secured to the sheath and projecting outwards therefrom; a cam surrounding the sheath over a certain length and made up of a ring having three ramps each in the form of a helical segment, the ramps receiving respective ones of the wheels, turning of the cam causing the companion flange to move in axial translation; and means for turning the cam. The invention is specially suited to filtering a ventilation circuit in a hostile environment in the nuclear industry.

3 Claims, 2 Drawing Sheets

SEALED CONNECTION DEVICE FOR A VENTILATION FILTER

The present invention relates to a sealed connection device for ventilation filters used in particular in the nuclear industry.

It relates more precisely to a device used more particularly in a hostile environment, on a ventilation circuit.

BACKGROUND OF THE INVENTION

Many filters, with filter medium, are used in the nuclear industry for filtering contaminated gas, e.g. on the internal ventilation circuits of confinement chambers. Very High Efficiency (VHE) and High Efficiency (HE) filters are known in particular.

Such filters must be mounted in sealed manner. All of the contaminated gas must pass therethrough.

They are generally tightly disposed inside a housing, with the help of a sealing system: e.g. gaskets.

In the prior art, filters are mounted in said housing on a plate, for example, and they are pressed against the flange of the ventilation circuit.

They are pressed by means of springs which exert a large amount of pressure on said plate, thereby ensuring sealing.

However, that pressure does not suffice to hold the filter in place in the event of an earthquake.

That known filter connecting device has major drawbacks.

In order to achieve the sealed connection, the force with which the filter is pressed against the flange must firstly be large.

Unfortunately, the force is generally exerted by means of pliers or remote manipulators.

Secondly, during the operation of replacing filters—said operation itself also generally being performed by remote manipulation—the filter must be forced into the housing between the flange of the circuit and the plate.

This implies deterioration due to rubbing against its sealing system: e.g. gaskets at its periphery.

OBJECTS AND SUMMARY OF THE INVENTION

The invention proposes a new sealed connection device which mitigates those drawbacks. Said device can be considered as an improvement to the present system described above, making use of a plate under tension, by means of springs.

The device of the invention includes:
- a cylindrical housing designed to receive said filter, the housing being fixed at a second end to a ventilation circuit flange and having a first end mounted on a companion flange, the companion flange being held in resilient manner under axial tension by holding means under tension;
- a sheath coaxial with and secured to said housing, about which sheath said companion flange slides axially in sealed manner, on which sheath there are disposed said holding means under tension, and to which sheath there are secured three fixed wheels projecting outwards therefrom;
- a cam surrounding said sheath over a certain length and constituted by a ring having three ramps each in the form of a helical segment, said ramps receiving respective ones of the wheels, turning of said cam causing said companion flange to move in axial translation; and
- means for turning said cam.

Turning said ramped cam, enclosing the three wheels connected to the fixed sheath, causes said cam to slide towards the first end of the housing, and after taking up a certain amount of slack, towards the first end of the companion flange.

The retraction of the companion flange which follows—by said companion flange sliding towards the first end of the housing, or in fact by compressing the holding means under tension—enables a new filter to be put into place, without the sealed joints being rubbed in a damaging manner.

Once the new filter has been put into place, turning the cam in the other direction—which causes it to slide towards the second end of the housing—"frees" the companion flange which presses said filter against the flange. The means for keeping the companion flange under axial tension exert sufficient pressure.

Said means can consist of prestressed springs and advantageously of prestressed spring washers disposed against a first end of the companion flange.

By means of the mechanical advantage provided by the cam, the device of the invention enables the small capability of the pliers or remote manipulators used to be reconciled with the significant pressing force required to press the filter against the flange of the ventilation circuit. The pressing force which is higher than in the prior art improves both the sealing of the circuit and the ability of the filter to withstand an earthquake.

Naturally and in like manner, the device of the invention can easily be manipulated by hand, via a glove box.

Such a device can thus easily be manipulated remotely; its use makes it possible to ensure both that the circuit is sealed and that the filter can withstand an earthquake. Finally, such a device is very compact.

It should be noted that the sheath of the device of the invention advantageously includes, at its first end, a cylindrical rim which makes it possible to extend the ventilation circuit by means of a connecting flange.

BRIEF DESCRIPTION OF THE DRAWINGS

The invention is described below with reference to the accompanying figures, in which.

MORE DETAILED DESCRIPTION

Figure 1:
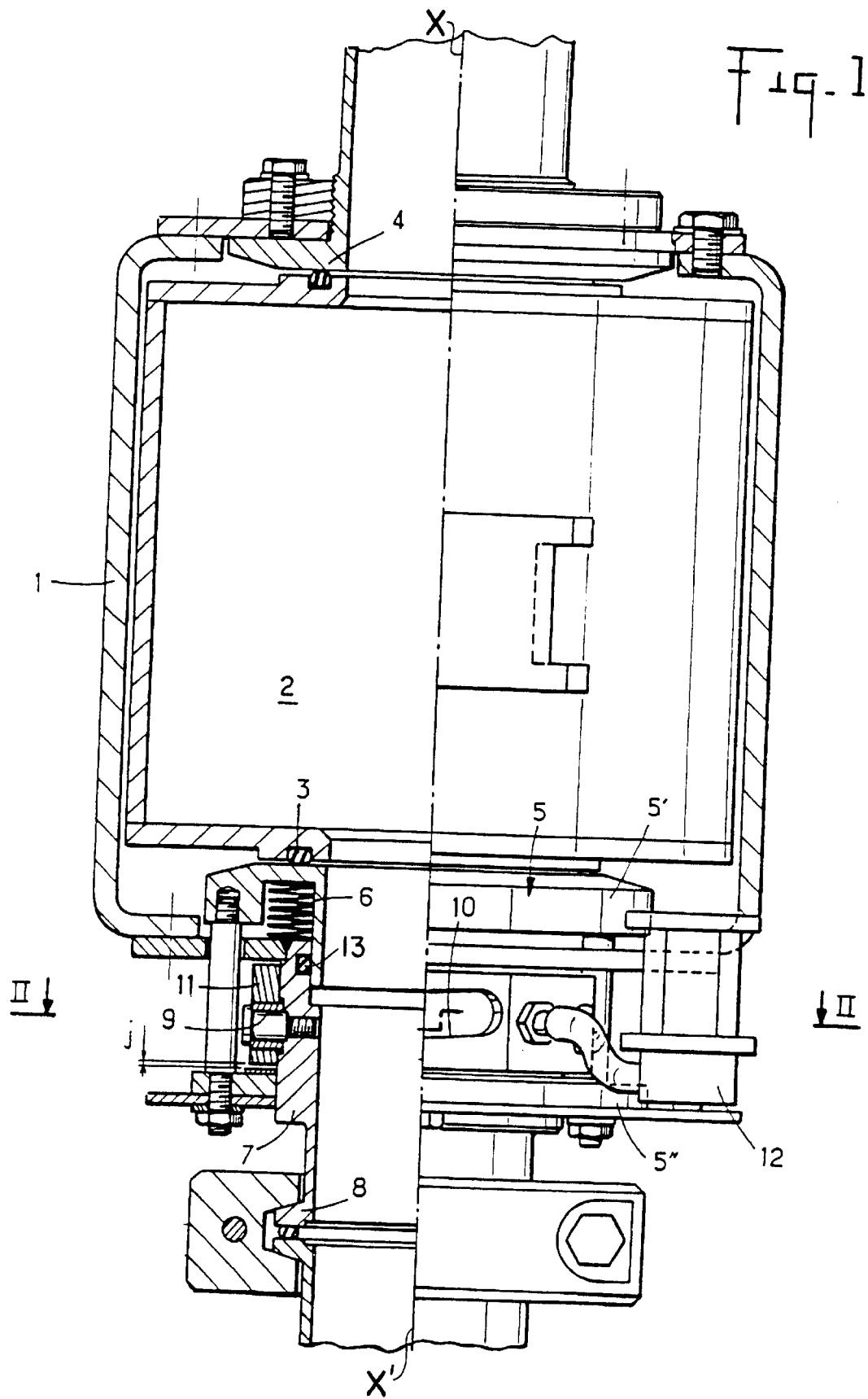
FIG. 1 is a front view of the device of the invention, shown partially in section on line I—I of FIG. 2.

The figures show the bracket 1 or vertical-axis cylindrical housing in which a filter 2 is to be housed in sealed manner. Housing 1 is rotatable about an axis X–X'. Said filter 2 includes a sealing system 3, e.g. an o-ring, at each of its bearing faces. Naturally, the direction of the axis X–X' of the housing can be horizontal or sloping without that modifying the operation of the device of the invention.

For good positioning and manipulation of the filter 2 in the housing 1, it is maneuvered manually or by means of a tool such as spring-loaded pliers.

Said filter 2 is put into place after the device of the invention has been disengaged.

The top portion, or second end, of the bracket or housing 1 is fixed to the flange 4 of a ventilation circuit.

The bottom portion, or first end, of said housing 1 is mounted on the companion flange 5. The companion flange is in fact constituted by a top plate 5' and by a bottom plate 5" secured by means of spacer-forming elements.

Said companion flange 5 is held under vertical tension by means of prestressed spring washers 6 that are vertically anchored on the sheath 7 under the companion flange 5. A sealing system 13 is placed between the sheath 7 and the companion flange 5.

Said sheath 7 is screwed to lie on the same axis X–X' as the housing 1. It includes an annular cylindrical rim 8 to enable the ventilation circuit to be extended (towards the bottom in FIG. 1). Three fixing screws are mounted on said sheath 7 for securing wheels 9, which wheels project radially outwards from said sheath 7 on horizontal axes. Said wheels 9 are received by helical ramps 10 open in the cam 11.

The drive device 12 for driving said cam 11 comprises a lever that can be indexed and remotely manipulated.

The lever can be secured to the bottom plate 5" of the companion flange 5 by means of a positioning finger.

Figure 2:
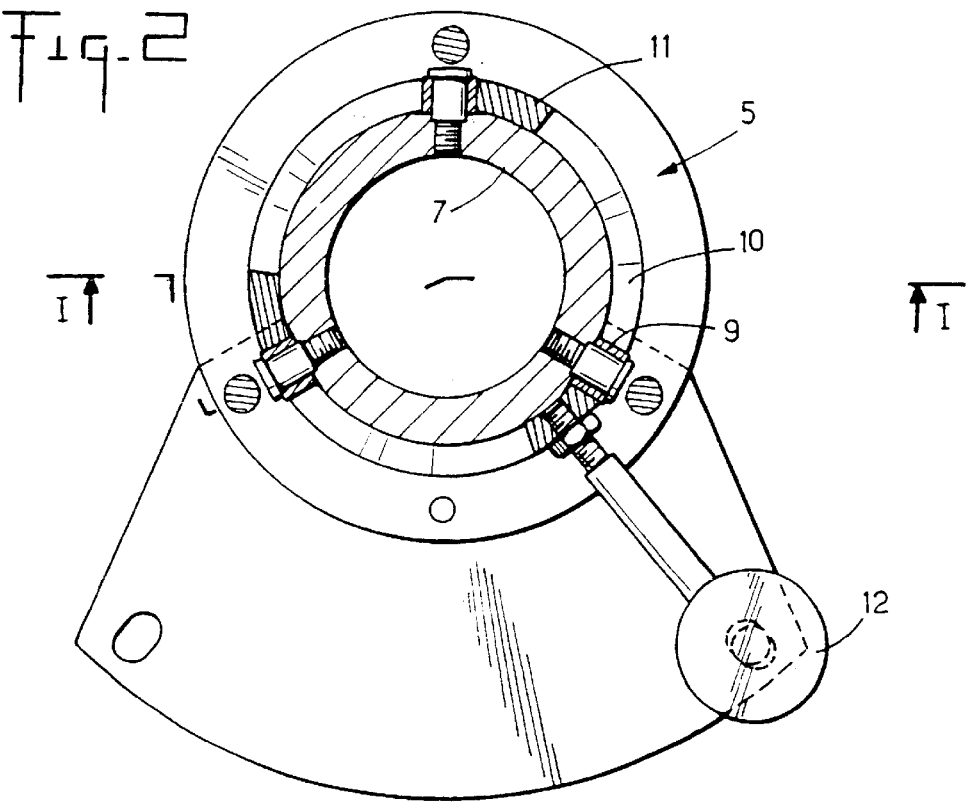
FIG. 2 is a section view from above of said device on line II—II of FIG. 1.
Figure 3:
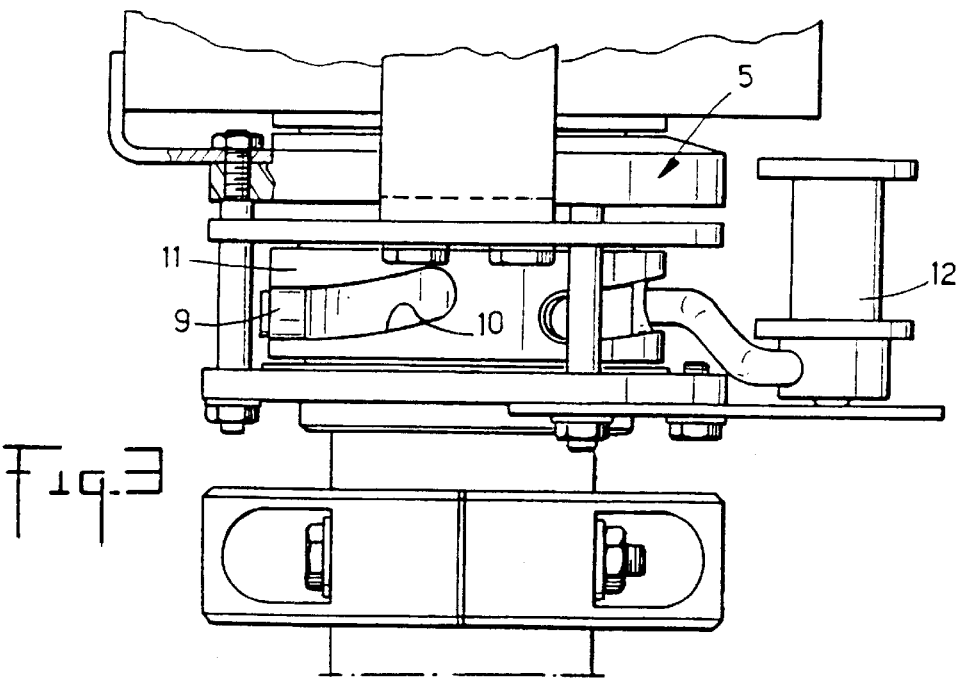
FIG. 3 is another front view of part of the device, showing the rolling tracks, i.e. the ramps, for the wheels present on the cam.

It should be understood that turning the cam 11 in a suitable direction (clockwise direction in FIG. 2) causes it to descend. After taking up the slack j, said cam 11 bears on the bottom plate 5" of the companion flange 5, driving said companion flange downwards by compressing the springs 6. The filter can then be changed easily without the problem of rubbing the gaskets 3.

By way of illustration, it can be noted that in the device of the invention a VHE filter of about 1 kg is subjected to a vertical thrust of about 35 kgf.

In particular, such a device enables remote manipulation to be used to connect VHE filters in sealed manner on the internal ventilation circuits of confinement chambers operating at subatmospheric pressure.

The originality of the invention resides both in its compactness and in its capacity to relieve remote manipulation to a great extent of the need to deliver a large amount of force in order to press the filter against the flange of the ventilation circuit, which force has, until now, been necessary in order to obtain a sealed connection.

It should be understood that the force required to retract the companion flange or to put it into a pressing position is reduced by means of the mechanical advantage created by the ramps of the cam and by the lever effect of the driver device turning the cam.

What is claimed is:

1. A sealed connection device for a ventilation filter for use on a ventilation circuit, the device comprising:
    a cylindrical housing adapted to receive said filter, the housing having an axis, the housing being fixed at a second end to a ventilation circuit flange and having a first end mounted on a mobile companion flange, the companion flange being held in resilient manner under axial tension by holding means under tension;
    a fixed sheath coaxial with and secured to said housing, about which sheath said companion flange slides axially, a sealing system being placed between the sheath and the companion flange, on which sheath there are disposed said holding means under tension, and to which sheath there are secured three fixed wheels projecting outwardly therefrom;
    a cam coaxially surrounding said sheath over a certain length and constituted by a ring having three ramps each in the form of a helical segment in which the helix is coaxial with said sheath, said ramps receiving respective ones of the wheels, turning of said cam around said axis of the housing causing said companion flange to move in axial translation; and
    means for turning said cam.

2. A device according to claim 1, wherein the holding means under axial tension of said companion flange comprise prestressed spring washers disposed against a first end of the companion flange.

3. A device according to claim 1, wherein said sheath includes a cylindrical rim at its first end to enable the ventilation circuit to be extended.

* * * * *